United States Patent Office 3,749,758
Patented July 31, 1973

3,749,758
POLYESTERS DERIVED FROM DIMETHYLOL PROPIONIC ACID IN ADMIXTURE WITH POLYEPOXIDES
John Allister Gannon, Toms River, N.J., assignor to Ciba-Geigy Corporation, Ardsley, N.Y.
No Drawing. Filed Sept. 30, 1971, Ser. No. 185,386
Int. Cl. C08g 45/14
U.S. Cl. 260—835          6 Claims

ABSTRACT OF THE DISCLOSURE

Compositions comprising carboxyl containing polyesters and di- or polyepoxides. The compositions when cured exhibit excellent adhesion to untreated and treated substrates, excellent flexibility and good resistance to chemical attack.

SUMMARY OF THE INVENTION

The present invention relates to novel compositions comprising carboxyl containing polyesters (prepared by the reaction of a dicarboxylic acid and a 2,2-di-(hydroxymethyl)carboxylic acid), and di- and/or polyepoxides. These compositions form excellent cured coatings on untreated and treated substrates, as well as being surprisingly useful as adhesives. The invention also relates to the use of said compositions in coatings, and adhesives.

DESCRIPTION OF THE INVENTION

It has been surprisingly found that compositions comprising a mixture of a polyester containing free carboxylic acid groups, and di- and/or polyepoxides (hereinafter both called polyepoxide) lead to cured resins which as coatings demonstrate surprising adhesion to untreated and treated substrates.

The present invention is therefore directed to compositions comprising a mixture of polyesters and di- and/or polyepoxides and mixtures thereof and to cured compositions derived from the above-mentioned compositions. The polyesters of the invention are those prepared by the reaction of a dicarboxylic acid with acid polyols of the class designated as 2,2-di(hydroxymethyl)carboxylic acid (or acid polyols and other active hydrogen compounds), said acid polyols containing a free carboxylic acid group which is substantially unreactive. The acid polyols more particularly are compounds of the formula

(I)

wherein R' represents hydrogen, alkyl of up to 20 carbon atoms, preferably from 1–8 carbon atoms and especially 1–3 carbon atoms. Representative compounds of this class are 2,2-di(hydroxymethyl)acetic acid, 2,2-di(hydroxymethyl)propionic acid, 2,2-di(hydroxymethyl)butyric acid, 2,2-di(hydroxymethyl)pentanoic acid and the like. The preferred compound being 2,2-di(hydroxymethyl) propionic acid.

The organic dicarboxylic acid may be aromatic, ar-aliphatic or aliphatic and may be in the form of their free acid or anhydride. Among the types of dicarboxylic acids to be employed in the preparation of the polyester those described in U.S. Pat. No. 3,491,066 may be employed, such as $C_{2-36}$ alkanoic di-acids, α,β-ethylenically unsaturated aliphatic di-acids, or aromatic (benzene) dicarboxylic acids such as phthalic acid (ortho, iso and tere), halo-substituted phthalic acid such as tetrachlorophthalic anhydride, oxalic acid, malonic acid, succinic acid, glutaric acid, sebacic acid, adipic acid, pimelic acid, suberic acid, azelaic acid, tartaric acid, malic acid, the dimers of dialkenoic acids such as Empol 1010, 1014 or 1016 dimer acids, and the like. Among the α,β-ethylenically unsaturated dicarboxylic acids which may be used in the practice of the process of the present invention are maleic acid, fumaric acid, itaconic acid, citraconic acid, chloromaleic acid, chlorofumaric acid and the like. Whenever available, the anhydrides of these acids may be used. These acids and/or their anhydrides may be used either singly or in combination with one another. Preferably, the dicarboxylic acids are dialkanoic acids of from 4–10 carbon atoms, dialkenoic acids of from 4–10 (especially 4–5) or the phthalic acids as indicated above. Especially, the dicarboxylic acids are adipic acid, phthalic anhydride and maleic anhydride.

The polyester component of the composition is prepared by reaction of the acid polyol with the dicarboxylic acid by the usual conventional procedures. For example, the polyol can be reacted with a dicarboxylic acid and if desired one or more additional active hydrogen compounds such as various diols and dithiols. The reaction is suitably carried out without a solvent by reacting the dicarboxylic acid and polyol in a ratio of from 0.75 to 1.5:1 moles of dicarboxylic acid to polyol at a temperature of 140–250° C. for a sufficient time (usually between 3–8 hours) to obtain an acid member of the final product of from 50–300 (preferably 100–250). If desired, the reaction may also be carried out in an inert organic solvent such as benzene, which is capable of azeotroping the water formed. Preferably, the reaction is carried out in a mole ratio of 0.75 to 1.25:1 and especially about 1:1, and at a temperature of from about 140–200° C. More specifically, the polyester is prepared as follows: The dicarboxylic acid and acid polyol is charged to a suitable reactor. The reaction mixture is then heated to 150–180° C. and the water of reaction is collected via a Dean Stark trap or other suitable means. The reaction is continued until all of the water is removed under reduced pressure. The polyester may if desired then be diluted with an organic solvent and used as such for the preparation of the compositions of the invention by the addition of the desired polyepoxide. Alternatively, the polyester may be added directly to the polyepoxide, particularly when said polyepoxide is a liquid. If additional active hydrogen compounds are employed, one must use at least 20 mole percent of a 2,2-di(hydroxymethyl)carboxylic acid to total polyol component. The following additional active hydrogen compounds can be employed if desired: ethylene glycol, diethylene glycol, propylene glycol, dipropylene glycol, butylene glycol, glycerol, 1,1,1-trimethylolpropane, 1,1,1-trimethylolethane, 1,2,6-hexanetriol, pentaerythritol, polypropylene glycols having molecular weights of up to about 1000, hydroxyl-terminated polyesters and lactone polymers having molecular weights of up to about 1000, oleyl alcohol, linolenyl alcohol; dithiols of up to 10 carbon atoms, such as decamethylene dithiol, hexamethylene dithiol. Preferred active hydrogen compounds are lower alkyl diols of from 1 to 6 carbon atoms, such as 1,4-butanediol, 2,2-dimethyl-1,3-propanediol, 1,6-hexanediol, diethylenediol.

The polyepoxide component of the novel composition is one containing more than one 1,2-epoxy group per molecule, and may suitably be derived from aliphatic, aromatic, heterocyclic ar-aliphatic, cycloaliphatic compounds or mixtures thereof. Possible epoxy compounds of the type defined above are for example: vinylcyclohexene dioxide, limonene dioxide, dicyclopentadiene dioxide, ethylene glycol-bis(3,4 - epoxytetrahydrodicyclopentadien-8-yl)ether, (3,4-epoxytetrahydrodicyclopentadien-8-yl)glycidyl ether; compounds having two epoxycyclohexyl residues such as diethylene glycol-bis-(3,3-epoxycyclohexane-carboxylate),
bis-3,4-(epoxycyclohexylmethyl)-succinate,
3,4-epoxy-6-methylcyclohexylmethyl-3',4'-epoxy-6'-methyl-cyclohexane-carboxylate and
3,4-epoxyhexahydrobenzal-3',4'-epoxycyclohexane-1',1'-dimethanol.

Further possible materials are polyglycidyl esters such as are obtainable by reacting a dicarboxylic acid with epichlorhydrin or dichlorhydrin in the presence of alkali. Such polyesters may be derived from aromatic dicarboxylic acids such as phthalic acid or terephthalic acid. Di-

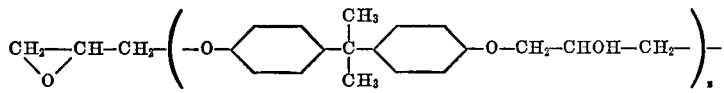

glycidyl adipate and diglycidyl phthalate may, for example, be mentioned.

Polyglycidyl ethers such as are obtainable by etherification of diphenol or polyphenol with epichlorhydrin or dichlorhydrin in the presence of alkali may also be used. These compounds may be derived from 1,5-pentanediol, 1,6-hexanediol, 2,4,6-hexanetriol, glycerine, and especially from diphenols or polyphenols such as resorcinol, pyrocatechol, hydroquinone, phenolphthalein, phenol-formaldehyde condensation products from the type of the novolacs, 1,4-di-hydroxynaphthalene, bis(p-hydroxyphenyl)methane, bis(p-hydroxyphenyl)methyl-phenylmethane, bis(p-hydroxyphenyl)tolylmethane, 4,4'-dihydroxydiphenyl, bis(p-hydroxyphenyl)sulphone and especially bis(p-hydroxyphenyl)dimethylmethane.

Preferred compounds are cycloaliphatic epoxide compounds. For example, there may be mentioned those of the formulae

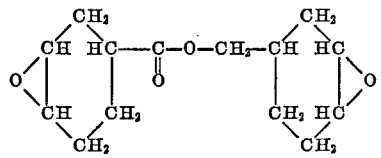

(=3,4-epoxycyclohexylmethyl - 3',4' - epoxycyclohexane-carboxylate),

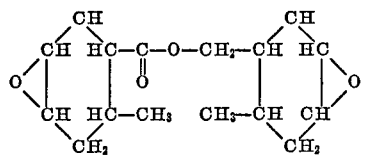

(=3,4-epoxy - 6 - methylcyclohexylmethyl-3',4'-epoxy-6'-methylcyclohexanecarboxylate) and

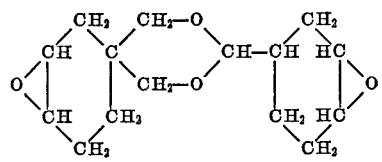

(=3,4-epoxyhexahydrobenzal - 3',4' - epoxycyclohexane-1',1'-dimethanol).

Amongst the specially suitable heterocyclic epoxide compounds there may be mentioned the triglycidyl isocyanurate of the formula

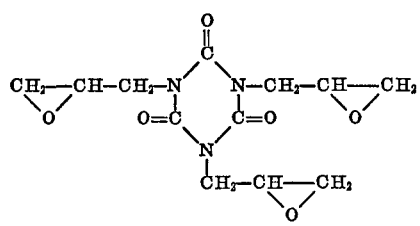

as well as the N,N'-diglycidyl-dimethylhydantoin of the formula

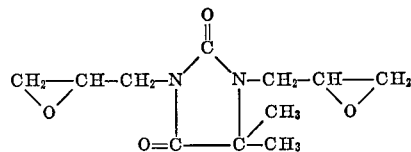

It is also possible to use mixtures of such cycloaliphatic and/or heterocyclic epoxide compounds.

Other preferred compounds are the polyglycidyl ethers of bis(p-hydroxyphenyl)dimethylmethane (bisphenol A) which correspond to the average formula

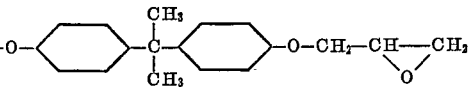

wherein z denotes an integral or fractional small number within the range of 0 to 2.

As indicated previously, the polyepoxide compound may be blended with the polyester itself or may be blended in a suitable solvent system, for example, alcohols, ketones, esters and aromatic hydrocarbons, such as methanol, sec-butyl alcohol, propanol, acetone, diethyl acetate, Cellosolve acetate, benzene, toluene, xylene and the like. The final composition is prepared such that between about 0.5 to about 2 equivalents of polyester, preferably between about 0.75 and 1.0 equivalents and especially about 1:1 equivalent based on the carboxylic content (derived from the 2,2-di(hydroxymethyl)carboxylic acid) per equivalent of epoxide is obtained. The final composition may suitably contain from about 10 to about 90% solids, preferably 25 to about 85% solids and especially from about 40 to about 80% solids. The desired percent solids can be obtained by adding an appropriate amount of inert organic solvent to make up the desired composition.

The composition thus obtained after cure exhibits good adhesion to untreated metal, chemical resistance and resistance to boiling water, especially after curing with crosslinking agents. The coatings prepared from the compositions of the invention show good adhesion to treated substrates, such as aluminum, steel, copper and glass, excellent flexibility and good resistance to solvents, acids and boiling water.

The composition may be suitably cured at temperatures of about 200 to 500° F. (and preferably from 300 to 450° F.) from about 5 to 60 minutes (and particularly 10–30 minutes). The compositions of the invention may be suitably cured with or without curing agents and/or accelerators. When it is desired to employ curing agents and/or accelerators, one may employ, for example, any of the well-known agents such as urea-formaldehyde resins, melamine-formaldehyde resins or phenol-formaldehyde resins, such as Cymel 255–10, Cymel 301, Araldite DP–139, tertiary amines, their salts or quaternary ammonium compounds, for example, 2,4,6-tri-(dimethylaminomethyl)phenol, benzyldimethylamine, 2-ethyl-4-methyl-imidazole or triamylammonium phenolate, alkali metal alcoholates, such as for example sodium hexanetriolate; dicyandiamide; phosphonium halide as described in U.S. Pat. No. 3,477,990, or Acryloid AT–50 (a trade name for an acrylic resin sold by Rohm and Haas). The curing agents may be employed on a solid basis in amounts of from 5 to 50% and preferably 10 to 30%. The accelerators may be employed on a solid basis in amounts of from 0.05 to 10% and preferably 0.1 to 5%.

Example 1

(A) A 3-neck, round-bottom flask equipped with stirrer, thermometer, reflux condenser and nitrogen purge is charged with 1 mole (134 g.) of dimethylolpropionic acid and 1 mole (146 g.) of adipic acid. The reaction mixture is heated to 150–180° C. and the water of reaction is collected via a Dean Stark trap connected to the flask assembly. The reaction is continued until all of the water is collected finally at a vacuum of approximately 100 mm. Hg and a temperature of 180° C. to yield the viscous polyester.

(B) The viscous polyester from (A) above is diluted with an organic solvent (methyl Cellosolve) to 60% N.V. and, after cooling to 25° C., blended with an epoxy resin prepared from bisphenol A and epichlorohydrin having an epoxy value of 0.51–0.55 equivalent per 100 gms. in a proportion of 1:1 equivalent epoxy/carboxyl group. The latter is calculated after titration of the polyester for acid number. The acid number is approximately 250.

Similarly, when an equivalent amount of (3,4-epoxycyclohexylmethyl - 3',4' - epoxycyclohexanecarboxylate), (3,4-epoxy-6-methylcyclohexylmethyl - 3',4' - epoxy-6'-methylcyclohexanecarboxylate), (3,4 - epoxyhexahydrobenzal-3',4' - epoxycyclohexane - 1,'1' - dimethanol) or crude diglycidyl ether of hydrogenated bisphenol A having an epoxy value of .4 to .5 equivalent per 100 gms. is used in place of the epoxy resin in part (B) above, similar results are obtained.

Similarly, when an equivalent amount of 2,2-di(hydroxymethyl)acetic acid, 2,2-di(hydroxymethyl)butyric acid or 2,2-di(hydroxymethyl)pentanoic acid is used in place of dimethylolpropionic acid in part (A) above, similar results are obtained.

Similarly, when an equivalent amount of phthalic acid, phthalic anhydride or maleic anhydride is used in place of adipic acid in part (A) above, similar results are obtained.

Similarly, when part (A) above is carried out at 140–160° C. or 180–200° C. instead of 150–180° C., similar results are obtained.

Similarly, when toluene or methyl ethyl ketone is used in place of methyl cellulose in part (B) above, similar results are obtained.

Example 2

The viscous polyester from Example 1A is reacted further at a temperature of 200 to 220° C. for a period of 5 hours under a vacuum of 1.0 mm. of Hg. The resultant high molecular weight polyester is then reacted in accordance with Example 1B using said high molecular weight polyester in place of the various polyester.

Example 3

80 parts by weight (solids basis) of a composition described in Example 1B is further blended with 20 parts by weight of a urea-formaldehyde resin (Reichold P-196-60) and 66 parts of methyl ethyl ketone. The formulation is at a final solids content of 40%.

A cure schedule of 10 minutes at 250° F. (121° C.) results in the following properties on untreated aluminum panels:

adhesion, cross-cut: excellent
methyl ethyl ketone rub, 100 simple rubs: pass
boiling water resistance, 90 minutes: no effect Similarly, over treated aluminum (Alodine 401 treated 5052 aluminum) the following results are obtained after baking for 10 minutes at 250° F. (121° C.):

adhesion, cross-cut: excellent
methyl ethyl ketone rub, 100 simple rubs: pass
flexibility, T-bend test: pass 3T

Example 4

(A) A 3-neck, round-bottom flask equipped with stirrer, thermometer, reflux condenser and nitrogen purge is charged with 1 mole (146 g.) of adipic acid and 0.8 mole (107.2 g.) of dimethylolpropionic acid. The reaction mixture is heated to 150–180° C. and the water of reaction is collected via a Dean Stark trap connected to the flask assembly. The reaction is continued until all of the water is collected finally at a vacuum of approximately 100 mm. Hg and a temperature of 180° C. to yield a viscous polyester.

(B) The viscous polyester from part (A) above is diluted with an organic solvent (methyl Cellosolve) to 60% N.V. and after cooling to 25° C. blended with an epoxy resin prepared from bisphenol A and epichlorohydrin having an epoxy value of 0.51–0.55 equivalent per 100 gms. in a proportion of 1:1 equivalent epoxy/carboxyl group. The acid number is 265.

Example 5

The composition described in Example 1 is blended with a urea-formaldehyde resin (Reichold P-196-60) in the ratio of 80 parts/20 parts by weight with no additional solvent to reduce the solids content. The final solids is 63.9%.

A cure schedule of 10 minutes at 250° F. (121° C.) results in the following properties on untreated aluminum panels:

adhesion, cross-cut: excellent
methyl ethyl ketone rub, 100 simple rubs: pass
boiling water resistance, 90 minutes: no effect Similarly, when Cymel 255–10 (melamine-formaldehyde resin from American Cyanamid) or Araldite DP–139 (phenol-formaldehyde resin from Ciba-Geigy Corporation) is used in place of urea-formaldehyde in the above example, similar results are obtained.

Example 6

The composition described in Example 1 is blended with a urea-formaldehyde resin (Reichold P-196-60) in the ratio of 80 parts/20 parts by weight and 112.7 parts of methyl ethyl ketone. The formulation has a final solids content of 35%.

A cure schedule of 10 minutes at 250° F. (121° C.) results in the following properties on untreated aluminum panels:

adhesion, cross-cut: excellent
methyl ethyl ketone rub, 100 simple rubs: pass
boiling water resistance, 90 minutes: no effect

Example 7

(A) A 3-neck, round-bottom flask equipped with stirrer, thermometer, reflux condenser and nitrogen purge is charged with 1 mole (146 g.) of adipic acid, 0.5 mole (67 g.) of dimethylolpropionic acid and 0.5 mole (53 g.) of diethyleneglycol. The reaction mixture is heated to 150–180° C. and the water of reaction is collected via a Dean Stark trap connected to the flask assembly. The reaction is continued until all of the water is collected finally at a vacuum of approximately 100 mm. Hg and a temperature of 180° C. to yield a viscous polyester.

(B) The viscous polyester from part (A) above is diluted with an organic solvent (methyl Cellosolve) to 60% N.V. and after cooling to 25° C., blended with an epoxy resin prepared from bisphenol A and epichlorohydrin having an epoxy value of 0.51–0.55 equivalent per 100 gms. In a proportion of 1:1 equivalent epoxy/carboxyl group. The acid number is approximately 150.

I claim:

1. A composition comprising (a) a polyester having an acid number of from 50–300, prepared by the reaction of mole ratio of 0.75 to 1.5:1 of an organic dicarboxylic acid and an acid polyol of the formula

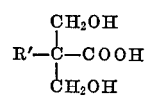

wherein R' is hydrogen or alkyl of up to 20 carbon atoms; and (b) a polyepoxide; said composition containing between about 0.5 to about 2 equivalents of polyester based on carboxylic content to about one equivalent of epoxide.

2. A composition of claim 1 wherein the polyester is prepared from a $C_{2-36}$ alkanoic di-acid or an aromatic dicarboxylic acid and an acid polyol wherein R' is hydrogen or alkyl of from 1–8 carbon atoms.

3. A composition of claim 2 wherein the polyepoxide is selected from the group consisting of cycloaliphatic epoxide and aromatic polyepoxide derived from polyglycidyl ethers of bisphenol A.

4. The composition of claim 1 which contains an inert organic solvent and a curing agent, wherein the solids content is from about 10 to about 90%, wherein R' of said acid polyol is hydrogen or $C_{1-3}$ alkyl, said dicarboxylic acid is an alkanoic acid of from $C_{2-36}$ carbon atoms, and said polyepoxide is selected from the group consisting of cycloaliphatic epoxide and aromatic polyepoxide derived from polyglycidyl ethers of bisphenol A.

5. A cured composition of claim 1.
6. A cured composition of claim 4.

References Cited
UNITED STATES PATENTS

| | | | |
|---|---|---|---|
| 3,491,066 | 1/1970 | Petropoulos | 260—75 EP |
| 3,404,018 | 10/1968 | Hicks | 260—835 |
| 3,427,266 | 2/1969 | Phillips | 260—32.4 |

PAUL LIEBERMAN, Primary Examiner

U.S. Cl. X.R.

260—22 D, 22 EP, 75 R, 75 T, 831, 834